United States Patent [19]

Karnaugh

[11] 4,114,143

[45] Sep. 12, 1978

[54] MODULAR SWITCHING SYSTEM

[75] Inventor: Maurice Karnaugh, Scarborough, N.Y.

[73] Assignee: International Business Machines Corporation, Armonk, N.Y.

[21] Appl. No.: 796,296

[22] Filed: May 12, 1977

[51] Int. Cl.² .................. H04Q 3/54; H04M 11/00
[52] U.S. Cl. ...................... 340/166 R; 340/147 R; 179/18 EB
[58] Field of Search ............... 340/166 R, 147 R; 179/15 AL, 15 AQ, 18 EB

[56] References Cited

U.S. PATENT DOCUMENTS

| 3,710,348 | 1/1973 | Craft | 340/147 R |
| 3,856,993 | 12/1974 | Closs et al. | 179/15 AL |
| 3,909,786 | 9/1975 | Lawrence | 340/147 R |
| 3,925,621 | 12/1975 | Collins et al. | 179/15 AL |
| 4,027,108 | 5/1977 | Moorehead et al. | 179/18 EB |
| 4,057,711 | 11/1977 | Asthana et al. | 340/147 R |

Primary Examiner—Donald J. Yusko
Attorney, Agent, or Firm—Alvin J. Riddles

[57] ABSTRACT

Three-stage switching network for digital, time division multiplexed channels that is structurally extendable may be constructed by placing on a single structural unit an input buffer with connection to one column of an orthogonal crosspoint matrix, an output buffer, a row of crosspoint gates with connections to all columns of said orthogonal crosspoint matrix, and transfer control logic.

10 Claims, 3 Drawing Figures

MODULAR SWITCHING SYSTEM

BACKGROUND OF THE INVENTION

Telecommunications technology is becoming increasingly digital in order to realize the economies made possible by progress in the field of large scale integrated digital circuits and in order to permit the integration of voice and data communications services in a common system. The technique for doing this most commonly involves the conversion of voice signals to pulse code modulated (PCM) form and the time division multiplexing of these PCM voice channels together with data channels. The switching of such digital, time division multiplexed (TDM) channels is accomplished in a digital TDM switch. Three stage switches are suitable for all but the smallest and a few of the largest exchanges.

Although switches of this type are well adapted to mixed voice and data traffic they also offer good functional characteristics for pure voice or pure data traffic.

Modular design of switches is highly desirable for economy of production, ease of installation, growth, and rapid field maintenance by personnel with limited training. The structural approach to satisfy this need thus far has been to consider the input section, the crosspoint matrix, and the output section as three separate entities, and to modularize each for field replacement or growth, as desired.

Progress in the art of large scale integrated circuits has made it possible to place thousands of gates or bits of memory on a single small chip of silicon.

A survey of some of the design considerations in the use of large scale integration is set forth in an article entitled, "Design Considerations for a Digital Switch" by M. Karnaugh, Proc. International Switching Symposium, Vol. 1, Kyoto, Japan, Oct. 25–29, 1976. By placing a number of such chips in a packaging module and a number of first level modules on a card or by using a fairly large first level module as a plug-in component to a circuit board, it is possible to construct a field replaceable module having very substantial functional complexity. This has advantages for field maintenance, because it is relatively easy to localize faults to large field replaceable units. Also, the number of distinct part types kept in inventory may be reduced if the parts are more complex in function. However, large modules require the development of complex hardware and software systems for testing in production and in factory maintenance. At the present state of the art, the cost of testing a product is roughly one third of the total cost of producing it. The increasing complexity of testing as integrated circuit technology advances is set forth in the article ATE: Not So Easy by Edward A. Toners, IEEE Spectrum, April 1977. In order to minimize the cost of test systems, reduce parts inventories, and simplify maintenance, it is desirable to assemble switches out of as few part types as possible.

DESCRIPTION OF THE INVENTION

In accordance with this invention, a modular concept of assembling digital time division multiplex switches is set forth in which increments of input sections, crosspoint gates, output sections, and associated control are assembled as a single subassembly entity.

The invention description is focused on a particularly useful and popular form of three stage digital TDM switch known as the time-space-time (TST) form. In this form the first switching stage comprises a set of random access memories (input buffers), each of which serves to permute the output sequence of the various channels which arrive from its associated TDM input. The second stage is a single orthogonal crosspoint array which, independently in each time slot, performs a set of one-to-one connections from the input buffers to the third stage output buffers. The output buffers are random access memories, each of which serves to permute the temporal sequence in which the channels that it receives will appear at its associated TDM output. Each stage of switching is controlled by a random access memory which directs its action in each time slot of the TDM frame. These actions are repeated identically in each frame until it is desired to alter the pattern of connections established in the switch, at which time the system controller will cause a change in the contents of the control memories.

In accordance with the modular concept of the invention, the input buffer communicates with one column of a crosspoint array whose column conductors appear in a conductor board and each of the crosspoint gates is connected to a distinct one of the columns in said board. The output buffer receives a signal from just one of said gates in each time slot. The time division multiplexed inputs to the input buffer and the timing signals are also received from conductors in said board while the time division multiplexed outputs from the output buffer are put out on another conductor in said board. This unit is then a single field replaceable subassembly type many of which can be arranged on an orthogonal conductor board to make up the entire switch.

DETAILED DESCRIPTION OF THE INVENTION

Figure 1:
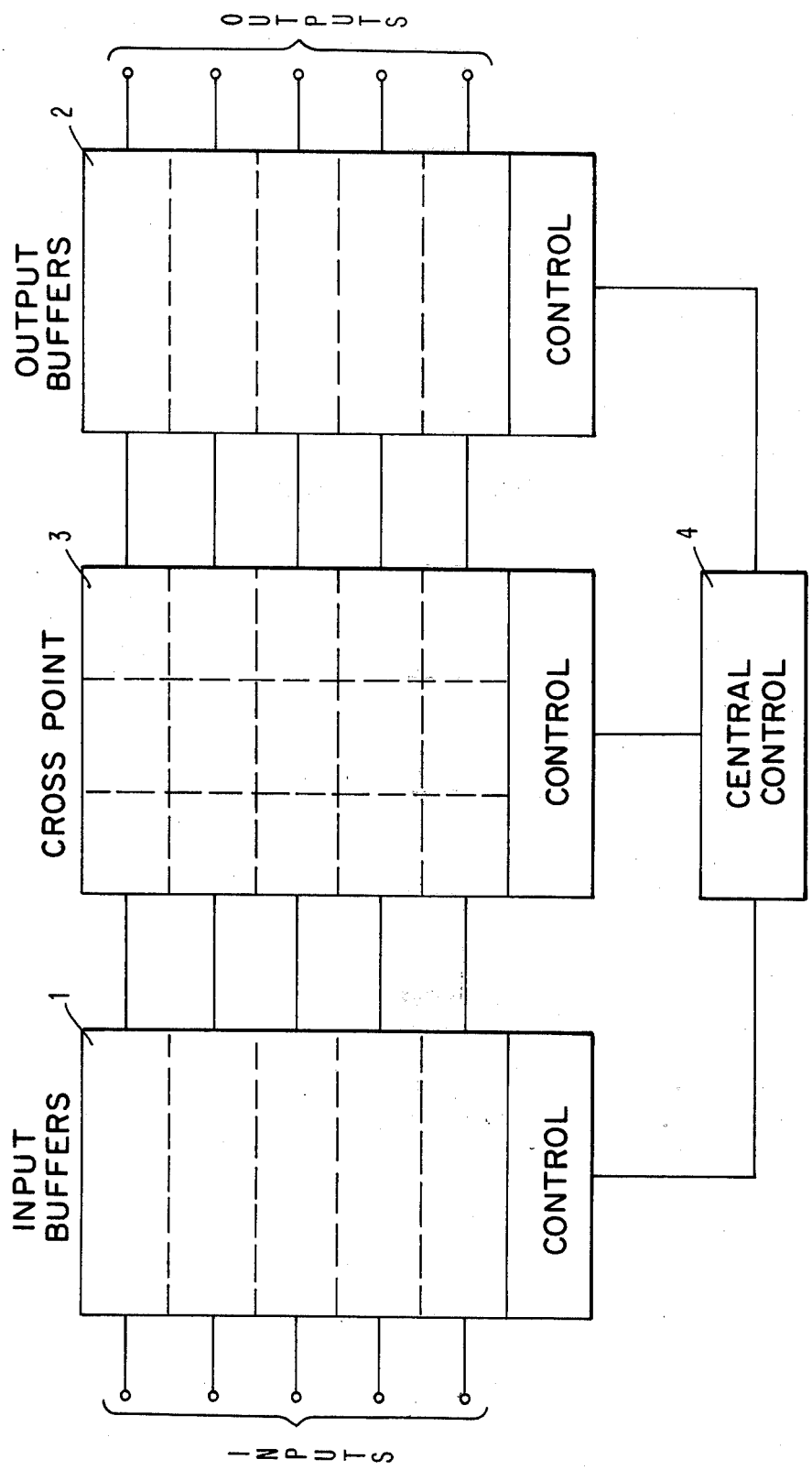
FIG. 1 is a schematic block diagram illustration of a time-space-time form of switching network.

Referring to FIG. 1 there is shown a schematic block diagram of a time-space-time form of switch. The switch is made up of essentially four parts, input buffers with associated control 1, output buffers with associated control 2, a crosspoint matrix 3 with associated control, and a central control 4. The function of the switch is to find a route through the crosspoint matrix for individual information samples that appear multiplexed at an input and to properly send the samples out a particular output at a selected time. To do this, under the guidance of the central control 4, the input buffers 1 and the output buffers 2 must work together to selectively store and to route the information samples through the properly selected crosspoint at the appropriate time slot in each time frame. The diagram of FIG. 1 also illustrates as dotted lines the general prior art technique of modularizing increments of the individual input, output and crosspoint entities. Obviously, this type of construction requires at least three part types and possibly many more.

In accordance with the invention a new time-space-time switch concept and approach at laying out such switches is provided. The concept provides, as a single subassembly level, input buffer capability for each switch input with associated communication capability to one crosspoint matrix column; output buffer capability with associated communication capability for a crosspoint matrix row gated to each crosspoint matrix column, and appropriate control for storing and transfer. The subassembly is a single unit which may be a printed circuit card with components mounted thereon or it may be a single or several semiconductor chips in a package. Each single subassembly unit with respect to the crosspoint matrix involves input communication capability to one column of the crosspoint matrix and input communication capability for the single row from all columns of the crosspoint matrix, as well as the appropriate external signal, clock, control, input and output communication points.

Figure 2:
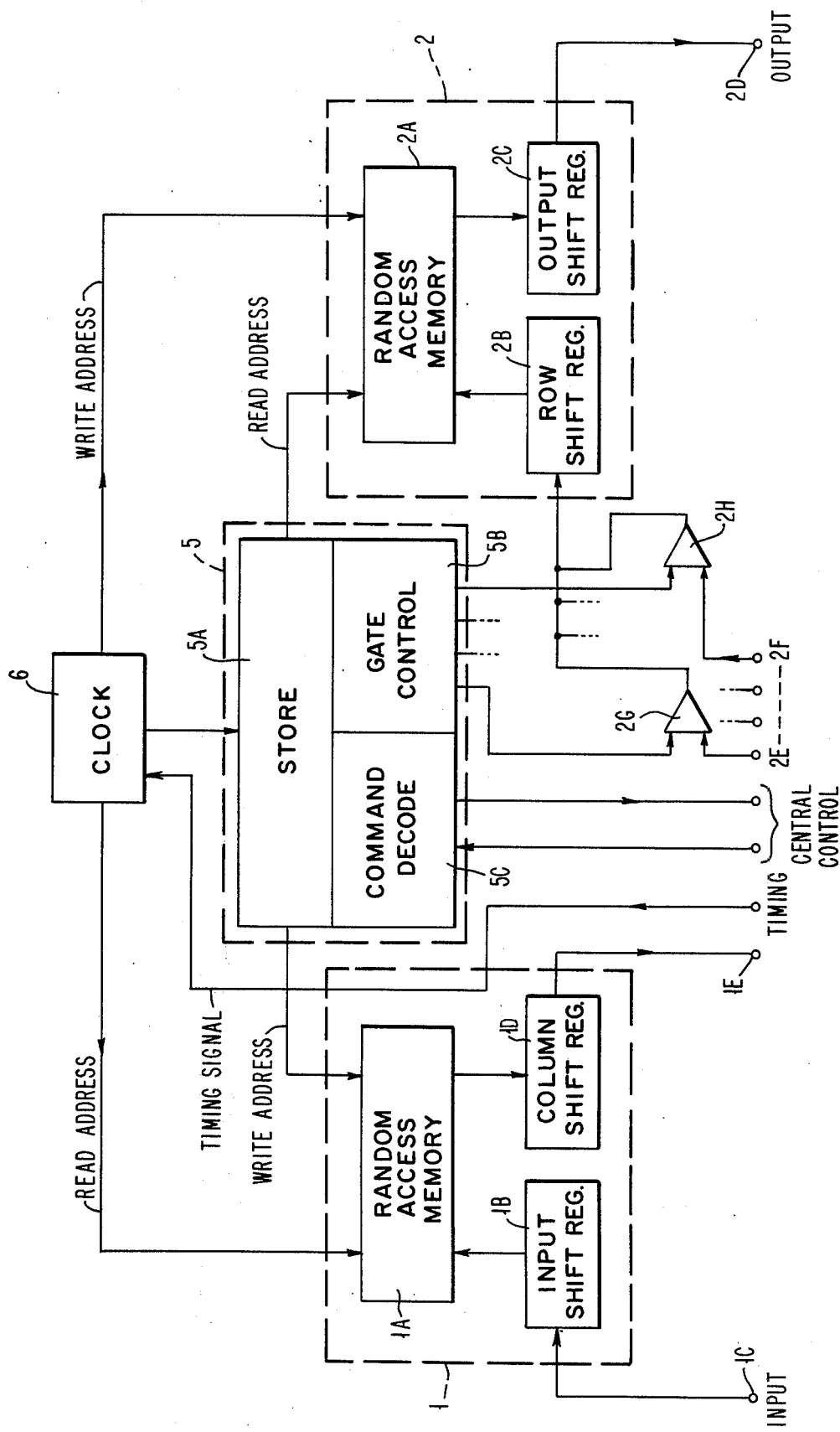
FIG. 2 is a schematic directed to the functions that are applied on a single subassembly level in accordance with the invention.

Referring to FIG. 2 the concept of the invention in time-space-time form and approach to laying out modular switches is illustrated. It will be apparent to one skilled in the art that many structural variations on the illustrated embodiment will be possible.

In accordance with the modular concept, for each input to the switch there is, on a single part, an input buffer section 1 made up of an input random access memory 1A, an input shift register 1B with an input terminal 1C, and a column communication shift register 1D. The output of 1D is connected to one column of the crosspoint matrix. This is illustrated as a connection to a terminal 1E which in turn can connect into the printed circuit board of the switch by a pin as will be subsequently described.

In the printed circuit board the terminal 1E will connect through a pin to one of N columns of the crosspoint matrix, all of which exist as conductors in the printed circuit board. Each of the N columns connects to a pin 1E receptacle at just one of N socket positions that will accept switch subassemblies. In this way, each subassembly unit's column communication can reach a distinct column of the crosspoint matrix by positioning of the subassembly.

The input random access memory 1A is capable of storing samples until communication time through the printed circuit board. The information samples arrive at the input terminal 1C where they enter the input register 1B serially and are set up for parallel transfer into word locations in the input random access memory 1A under the control of a write address signal supplied by a store portion 5A of the control unit 5. The store portion 5A of the control 5 performs the function of coordinating the sequential actions of the switch. Under control of a clock 6, the information sample word is read out of its assigned position in the input random access memory 1A in parallel into the column communication shift register 1D where the information sample word is converted to a sequence of pulses for delivery to an assigned column of the crosspoint matrix.

Similarly, an output section 2 is provided, made up of an output random access memory 2A, a row communication shift register 2B, having gated connection to each column of the crosspoint matrix and an output shift register 2C connected to an output 2D.

The gated row communication is provided by a series of Terminals 2E ... 2F, each of which connect with a distinct column in the printed circuit board and gates 2G ... 2H only one of which is open at a time under control of the gate control section 5B of the control 5.

The control unit 5 is also provided with a command decode section 5C. The command decode section 5C is influenced by a central system controller, not shown, that operates to determine the contents of the contents of the control store 5A and thereby to determine the sequential actions of the switch. These central control inputs and outputs are so labelled in FIG. 2. All transfer is timed by the clock 6 which, although it may be located on each individual subassembly part as illustrated, may, alternatively, be located central to the entire switch assembly. Timing signals are transmitted through a terminal so labelled.

In operation, the pulse coded information sample word enters the input shift register 1B via input 1C serially and is transferred in parallel into an assigned word position in the random access memory under a write address signal from the store 5A of the control 5. At an appropriate clock time a read address signal is supplied by the clock, which permits the word to be transferred in parallel to the column communication shift register 1D and serially to the assigned column through terminal 1E. Under control of the gate control portion 5B of the control 5, the appropriate gate, for example 2G, is rendered conductive and the word passes serially to the row communication shift register 2B where it is transferred in parallel to an assigned memory position in the output random access memory 2A under a read address from the store portion 5A of the control 5, in parallel into the output shift register 2C and then serially to the output 2D.

Figure 3:
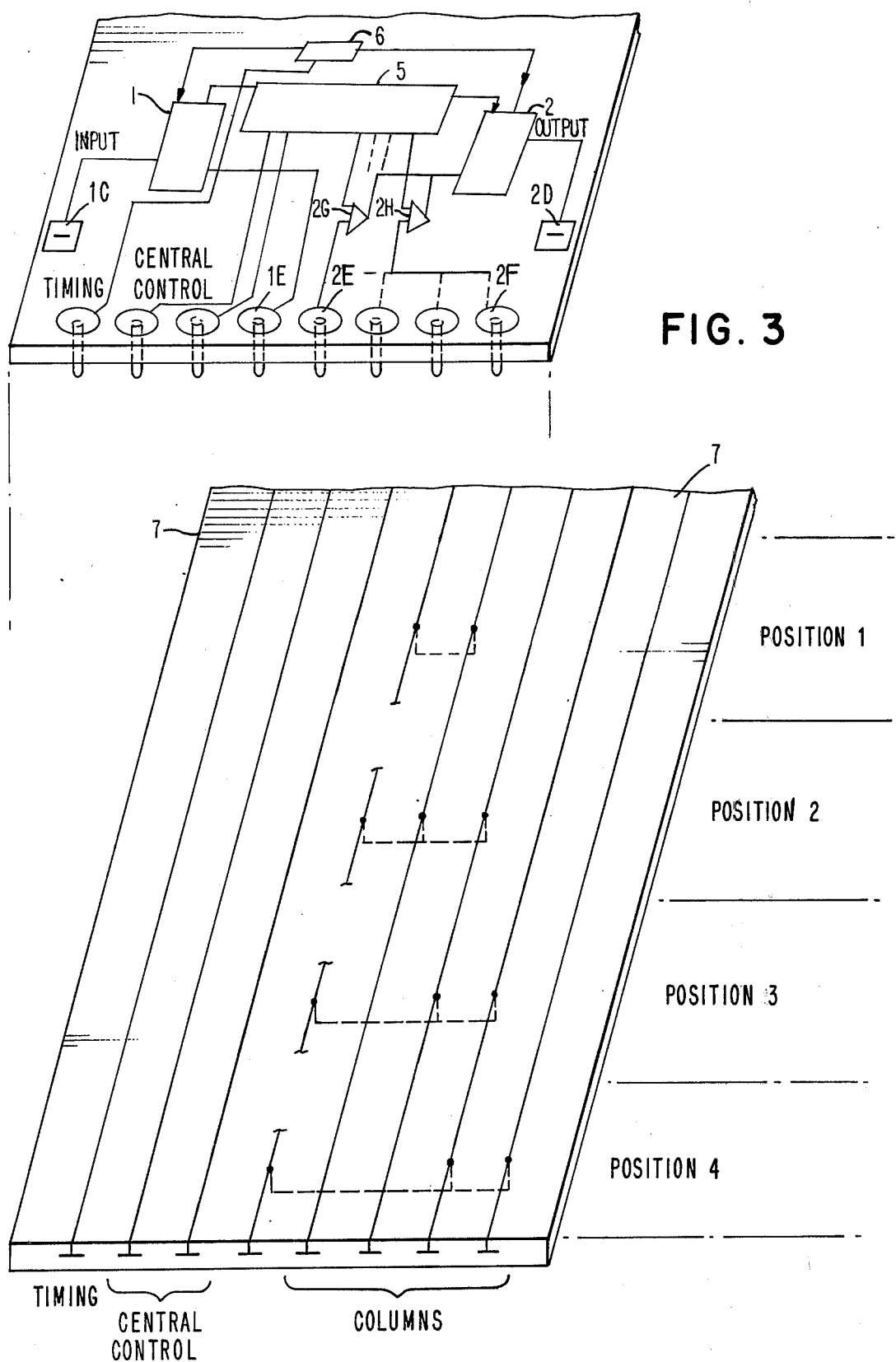
FIG. 3 is an illustration of the relation of the subassembly level to the overall crosspoint board.

With the modular approach of the invention a single part serving a single input and output is provided which may be plugged, as illustrated in FIG. 3 into a printed circuit board to provide an array extendable as desired. The single part contains all switching capability such that the printed circuit board need contain no active switching elements and can be for signal conduction only.

In FIG. 3 a view is shown illustrating the terminal discussed in FIG. 2 as pins that permit the assembly unit of the invention to be positioned on the printed circuit board at positions as ilustrated for communication to the proper column. The printed circuit board 7 has provision for mounting a subassembly at any one of four positions for connection to a particular column.

While the discussion has focused, for explanation, on a connection to a single column and having gates to all columns in a row, it will be apparent that it would also be feasible to have gates to all rows and connect the row shift register to a single row.

In order to provide a starting place for one skilled in the art to practice the invention the following set of specifications is provided of an example array wherein the digital inputs are multiplexed in 512 time slots per frame, each time slot contains one eight bit sample, and the frame repetition rate is 8000 per second, resulting in a frequency of 32,768 megabits per second.

| | | |
|---|---|---|
| 1 | Shift Registers 1B, 1D, 2B, 2C | 8 Bits |
| 2 | Input And Output Random Access Memories 1A and 2A | 512 positions × 8 bits each |
| 3 | Control Store Random Access Memory 5A | 512 positions × 9 bits +512 positions × 9 bits +512 positions × 4 bits |

| | | -continued |
|---|---|---|
| 4 | Clock 6 | A nine bit counter which derives its stepping and framing signals from the timing intput pin. |
| 5 | Command Decode -5C | A shift register with 22 bits to hold the contents of one word of the control store 5A plus 9 bits to hold the address corresponding to a given time slot, plus 2 bits to hold a command. The commands may be:<br>00 null<br>01 read only<br>10 write only<br>11 write and read<br>Logic to bring about implementation of the commands is included in the Command Decode section. |
| 6 | Gate Control -5B | A set of sixteen logic gates which, under control of 4 bits from the store 5A, cause only one of the gates 2G 2H to transmit a sample from a given column to the row shift of register 2B. In this example, the maximum number of switch subassemblies is sixteen, and the maximum number of individual channels which can be switched is 16×512 = 8192. |

Although the example uses separate 9 bit words to control the write address in the input random access memory and the read address in the output random access memory, it is possible, in some applications, to derive both of these addresses from the same 9 bit word in the control store 5A. If the input and output channels are identified as paired halves of full duplex channels, and if the internal time slots of the switch are paired to form full duplex connections, then this can easily be done. For example, time slots may be paired by complementing a single binary digit of the binary address. Then, when channel "a" transmits in time slot J, channel "a" will receive in the complementary time slot $\bar{J}$. This is achieved by complementing some selected bit in the address used to control reading in the output random access memory 2A at the time when the channel "a" output is read.

It is also possible to design space-time-space switches according to the principles of this invention, so as to have only a single subassembly type. In this case, a row of the input crosspoint matrix, a single random access memory for the channels, and a column of the output crosspoint matrix, along with the necessary controls, are assembled on a single subassembly level such as a printed circuit card or integrated circuit package. The switch then grows to its designed maximum size by plugging additional subassemblies into a printed circuit board. In the case of the space-time-space switch, each subassembly module cannot be identified with a single input or output multiplexed line.

Other modifications which may be used within the spirit of this invention include the use of parity bits to detect errors in storage, transmission, or control, and the use of parallel or combined serial-parallel transmission of samples instead of the pure serial transmission used in the illustration.

The modular switches described, each occupying one printed circuit board, may also be used as modules of still large switches. For example, the time-space-time switches may be modules of space-time-space-time-space switches when very large numbers of channels must be switched.

What has been described is a digital communication switching array wherein a single subassembly level part type may be constructed to communicate with a printed circuit board so that expansion can be accomplished with the same part type.

What is claimed is:

1. In a digital switch of the type wherein time division multiplexed information arriving at one of a plurality of inputs is switched through an interconnecting matrix of rows and columns of conductors to one of a plurality of outputs, the improvement comprising:
a conductor matrix part, and
positioned thereon a single part type for each said row conductor of said interconnecting matrix,
said single part type comprising:
an input terminal connected to an input buffer, communication capability with one column of said conductor matrix part,
an output terminal connected to an output buffer, and means providing gated communication with all columns of said conductor matrix part and control means associated with said input buffer, said output buffer and said gated communication means to transfer information from one said input terminal to one said output terminal at a specified time.

2. The switch of claim 1 wherein said communication capability with one column is effected for a particular column by specific positioning of said single part type on said orthogonal conductor matrix.

3. In a digital switch wherein input signals enter a buffer and are switched through an orthogonal conductor matrix to one of a plurality of outputs, the improvement comprising:
a single individual part type unit having thereon all electronic functions for processing input and output information from the input to the output terminals thereof through a crosspoint interconnecting matrix;
a separate one of said single part type units for each parallel member in one direction of said crosspoint matrix;
a board member containing at least a conductor for each parallel member of said crosspoint matrix orthogonal to said one direction, and
communication means associated with each said separate one of said single part types and operable to provide input communication capability to one conductor in said board member; and
gated communication means associated with each said separate one of said single part types and operable to provide gated output communication capability from all conductors in said board.

4. A modular switching array comprising in combination:

a board of conductors arranged in essentially column configuration;

a plurality of input digital time division modulated information channels;

a plurality of output digital time division modulated information channels; and one switching module per input and output channel combination including an input buffer, an output buffer, a connection to one column, gated connections to all columns in a row and input, output and gate control means.

5. The array of claim 4 wherein said conductor matrix includes internal column assignment connections by position on the array.

6. A switching array where information samples are switched from a time multiplexed input through a column and row type conductor matrix to a time multiplexed output comprising in combination:

a column conductor array board;

a switching part for each row mounted thereon
  each said switching part having for each input thereon input buffer means;
    communication means to one column conductor in said board;
    gated communication means to all column conductors in a row;
    said gated communication means having means to insure that only one gate conducting at a particular time output buffer means; and
  coordinating control means for said input buffer, and said output buffer on each switching part.

7. The array of claim 6 wherein assignment of a particular said communication means to column is accomplished by position on said conductor array.

8. A telecommunications switch comprising in combination:

a conductor member having columns of conductors and at least one switching assembly mounted in the position of a row across said columns and having an input buffer capability, direct connection means from said input buffer capability to one of said columns, and gated connection means from all columns in a row to said output buffer, said gated connection means including means to insure that only one gate in a row is conducting.

9. A telecommunications switch for switching signals from a selected one of a plurality of inputs to a selected one of a plurality of outputs comprising in combination:

a conductor member having a plurality of conductors arranged in columns;

a switching assembly for input and output combinations in row positions across the column comprising for each input an input buffer capability made up of an
  input shift register,
  a random access memory and a column communication shift register,
  column communication capability means between said column shift register, and for each input one column of said conductor member, an output buffer capability made up of for each output an output row communication shift register, an output random access memory and an output shift register, and gated communication means between each column in a row and said output row communication shift register.

10. The switch of claim 9 wherein said column communication means for a particular column is effected by positioning the switching assembly at a particular position on said conduction member.

* * * * *